United States Patent [19]

Blom

[11] 4,365,271

[45] Dec. 21, 1982

[54] TELEVISION CAMERA HAVING A BEAM CURRENT CONTROL CIRCUIT

[75] Inventor: Hendrik Blom, Breda, Netherlands

[73] Assignee: U.S. Philips Corporation, New York, N.Y.

[21] Appl. No.: 191,099

[22] Filed: Sep. 26, 1980

Related U.S. Application Data

[63] Continuation of Ser. No. 958,318, Nov. 11, 1978, abandoned.

[30] Foreign Application Priority Data

Dec. 8, 1977 [NL] Netherlands ........................ 7713571

[51] Int. Cl.³ .......................................... H04N 5/19
[52] U.S. Cl. ...................................... 358/219; 358/50
[58] Field of Search ...................... 358/41, 50, 52, 74, 358/219

[56] References Cited

U.S. PATENT DOCUMENTS

| 3,315,034 | 4/1967 | White | 358/219 |
| 3,999,011 | 12/1967 | Sato et al. | 358/219 |
| 4,151,552 | 4/1979 | Sato et al. | 358/219 |
| 4,190,865 | 2/1980 | Bendell | 358/219 |

Primary Examiner—John C. Martin
Attorney, Agent, or Firm—Thomas A. Briody; William J. Streeter; Edward W. Goodman

[57] ABSTRACT

A television camera comprising a control stage and a setting stage for the beam current control of an electron beam in a pick-up tube. Via a video frequency picture signal amplifier suitable for processing the picture signal generated by the pick-up tube, the picture signal generated by the pick-up tube is superimposed via a coupling capacitor as a control voltage on the setting voltage for the control electrode of the pick-up tube. A stable beam current control without oscillations is the result.

4 Claims, 1 Drawing Figure

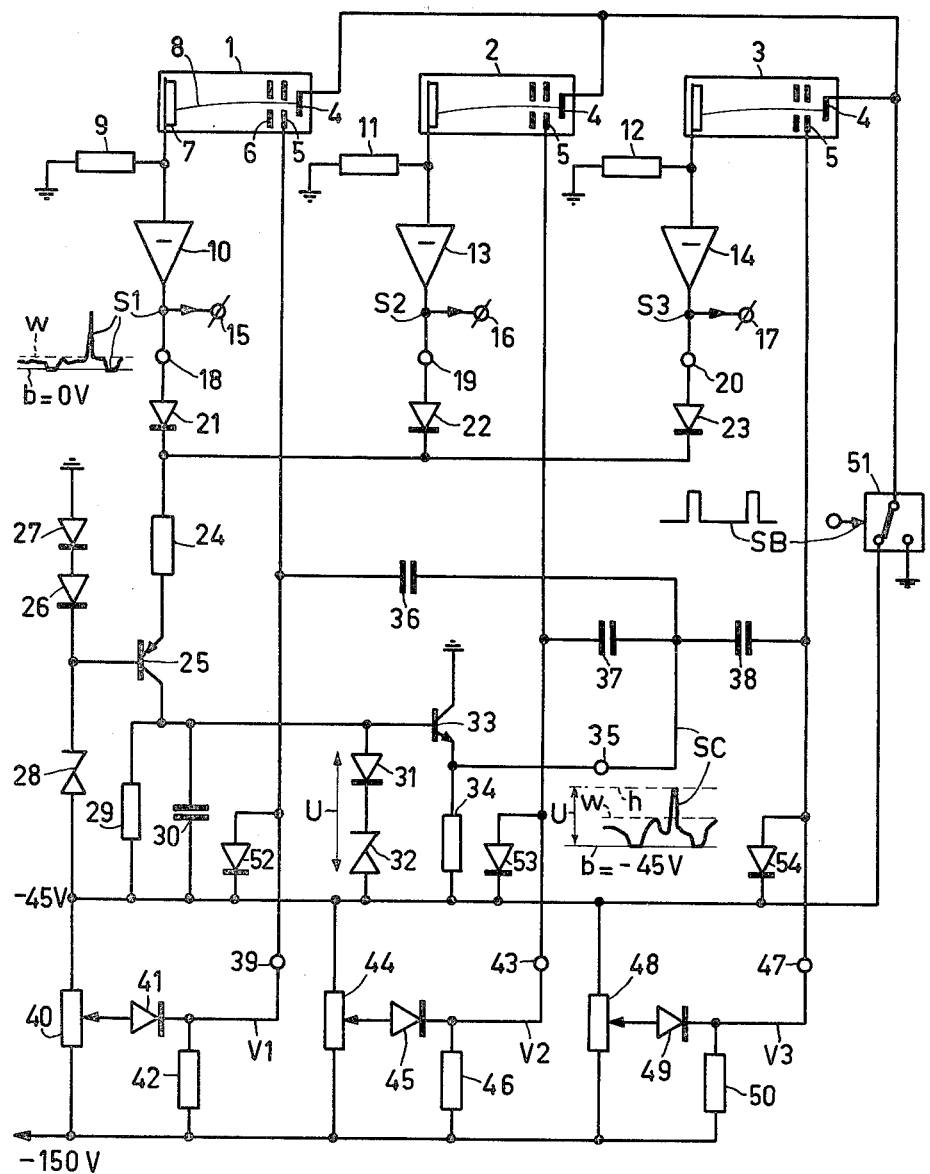

TELEVISION CAMERA HAVING A BEAM CURRENT CONTROL CIRCUIT

This is a continuation of application Ser. No. 958,318, filed Nov. 11, 1978, now abandoned.

BACKGROUND OF THE INVENTION

The invention relates to a televisioncamera comprising at least one pick-up tube and a control circuit for the intensity control of an electron beam present in the pick-up tube, the electron beam being generated by an electron gun comprising at least a cathode and a control electrode, an output, carrying a picture signal, of the pick-up tube being connected for beam current intensity control to a control input of the control circuit, an output of which, carrying a control signal, being connected to the control electrode in the pick-up tube, the control circuit comprising a setting stage for an adjustment of the beam current intensity and a control stage for an automatic control thereof.

Such a camera is described as a prior art camera in German Auslegeschrift No. 24 24 402. It is described that the picture signal generated by the pick-up tube is subjected to the following processes in the control circuit: the picture signal is first amplified, thereafter a black level in the picture signal is clamped on a reference level by means of a clamping circuit and then that signal portion which exceeds a nominal peak-white value is separated from the picture signal and, via a low-pass filter in which the smoothed signal is superimposed on a d.c. voltage for adjustment, applied to the control electrode of the electron gun in the pick-up tube.

It is described that a drawback of the prior art camera is that oscillations can and will in practice frequently occur due to the feedback. As regards the cause or possible several causes, respectively, of the oscillations, it is remarked that an exact indication cannot be given. Finally the described camera is said to be highly instable and unsuitable for practice.

SUMMARY OF THE INVENTION

It is an object of the invention to provide a camera, comprising a control circuit for the beam current control, in which no oscillations caused by this control occur. A camera according to the invention comprises a control circuit which is characterized in that the control stage comprises, provided between the control input of the circuit and the output of the control stage, a video frequency picture signal amplifier suitable for processing the picture signal generated by the pick-up tube the output of the control stage being connected through a coupling capacitor to the output of a setting stage and at the same time to the control electrode of the pick-up tube.

A television camera suitable for color television and provided to this end with at least two pick-up tubes is characterized in that a single control stage and at least two setting stages are provided, each of these setting stages being connected by means of a setting stage output to the control electrode of the electron gun of one of the pick-up tubes, these control electrodes of the pick-up tubes each being connected via a coupling capacitor to the output of the control stage, the control circuit comprising at least two control inputs connected to the picture signal outputs of the pick-up tubes, which control inputs are connected to said video frequency picture signal amplifier via a circuit for passing the picture signal having the instantaneous highest value.

A television camera in accordance with the invention is further characterized in that the video frequency picture signal amplifier includes an amplitude limiter.

A television camera is in accordance with the invention is further characterized in that the substantially video frequency picture signal amplifier includes a bandwidth limiter resulting in a bandwidth limitation to the order of magnitude of 1.5 mHz.

To prevent damage to the electron guns therein, a camera is furthermore characterized in that the connection of said coupling capacitors to the control electrodes of the electron guns of the pick-up tubes are each connected via the anode-cathode path of a respective diode to a supply terminal for the cathode of the electron gun of the pick-up tube.

DESCRIPTION OF THE DRAWING

The invention will be further explained by way of non-limitative example with reference to the accompanying FIGURE showing the control circuit of the invention.

DESCRIPTION OF THE PREFERRED EMBODIMENT

Reference numerals 1, 2 and 3 in the FIGURE denote three pick-up tubes which are part of a color television camera. The pick-up tubes 1, 2 and 3, which are implemented in the same manner, are shown schematically, having only those components which are important for describing the invention so that, for example, deflection and focussing means provided at the pick-up tubes 1, 2 and 3 have been omitted. For the pick-up tube 1 the following components are denoted in greater detail as example for the tubes 1, 2 and 3: a cathode 4, a control electrode 5, an accelerating electrode 6 and a target plate 7. The target plate 7 consists of a transparent, electrically conducting signal electrode on which a semi-conductor layer is provided which is scanned by an election beam 8 produced by an electron gun (4, 5, 6). For the electron beam 8, it is desirable to keep the beam current intensity as low as possible since with the smaller beam diameter, details in the potential image of the scene on the semiconductor layer are processed with a greater resolution than with a wider beam. On the other hand, the beam current intensity must be so high that, in the short period in which the electron beam 8 is in a given position, sufficient electric charge is suppliedqto compensate for the charge which was accumulated under the influence of incident light derived from the scene, which charge is present on the semiconductor layer of the target plate 7. Because of this, voltages are supplied in a manner still to be described to the cathode 4 and the control electrode 5 such that there is an appropriate adjustment of the beam current intensity for processing scene portions of a normal light intensity, while the current intensity is instantaneously considerably increased by the processing of scene portions having an excessive light intensity.

The target plate 7 of the pick-up tube 1 is connected via a resistor 9 to ground and furthermore to the input of a signal amplifier 10. The same applies to the pick-up tubes 2 and 3, the target plates of which being connected, via resistors 11 and 12, respectively, to ground and to the inputs of amplifiers 13 and 14, respectively. The output of the amplifiers 10, 13 and 14, respectively, are connected to output terminals 15, 16 and 17, respectively, and to control inputs 18, 19 and 20, respectively, of a control circuit to be described still further. At the output of the amplifiers 10, 13 and 14, respectively, there are amplified inverted picture signals S1, S2 and S3, respectively, which are generated by the pick-up tubes 1, 2 and 3, respectively, across the resistors 9, 11 and 12, respectively, and which collectively give a picture of the scene display. The FIGURE shows the picture signal S1 by way of example for the picture signals S1, S2 and S3, as a function of time. Reference letter b denotes a black level and w, a peak-white value, it being possible, in the case shown in the drawing, that b=0V, w=+1V. The signal S1 also shows a signal peak which far exceeds the peak-white value w and which is associated with a local excessive illumination caused by a bright light-reflecting or luminous scene detail. The signal S1 shows two positions where the picture signal is at the black level b, these positions corresponding to the conventional line blanking times for television.

The picture signals S1, S2 an S3, derived from the output terminals 15, 16 and 17 can be subjected, prior to the ultimate display, to further signal processings, such as gamma correction, aperture correction, matrixing, additional amplification, etc. Via the control inputs 18, 19 and 20, the picture signals S1, S2 and S3 are applied to the anodes of three respective diodes 21, 22 and 23, whose cathodes are interconnected and connected to a resistor 24. The other connection terminal of the resistor 24 is connected to the emitter of a pnp-transistor 25, whose base is connected to ground via the cathode-anode paths of two series-arranged diodes 26 and 27. The diodes 21, 22, 23, 26 and 27, the resistor 24 and the transistor 25 constitute together a circuit (21–27) for passing the picture signal of the instantaneous highest value of the three picture signals S1, S2 and S3 applied thereto. For simplicity it is assumed that the signal S1 has, for the entire duration, shown in the drawing, the highest instantaneous value of the three picture signals S1, S2 and S3 and consequently determines the collector current of the transistor 25.

The cathode of the diode 26, which cathode is connected to the base of transistor 25, is connected to the cathode of a zener diode 28 whose anode carries a voltage of, for example, −45V via a connection, to be described further in the course of this description, to a supply terminal carrying a negative voltage. The collector of the transistor 25 is connected to the zener diode anode connecting point of −45V the parallel combination of a resistor 29, a capacitor 30, a series arrangement of a diode 31 and a zener diode 32 and the base-emitter path of an npn-transistor 33 in series with a resistor 34. The collector of the transistor 33 is connected to ground. The junction of the emitter of the transistor 33 and the resistor 34 is connected to an output 35 of a control stage (18–35) thus formed, which supplies a control signal SC shown in the drawing.

The control stage (18–35) comprises a video frequency picture signal amplifier (24–34) for processing the picture signals S1, S2 or S3, applied thereto, generated in the pick-up tubes 1, 2 or 3. This is illustrated by means of the control signal SC which, as assumed, is derived from the signal S1, at which control signal SC the black level b=45V and the peak-white value w are plotted and, in addition, a limiting level h is stated. For the operation of the amplifier (24–34) it holds that in the presence of the black level b=0V at the input 18, taken by way of example, the transistor 25 is cut-off as its base has two diode threshold voltages (26 and 27) below the ground potential and the emitter is lower for the same amount due to the threshold voltage of diode 21 and the base-emitter threshold voltage of the transistor 25. The transistor 33 is likewise cut-off by the same voltage at the base and the emitter, so that the black level b=45V occurs in the signal SC at the output 35 via the resistor 34. The occurrence in the signal S1 of the peak-white value w=1V is found at an enlarged scale in the signal SC, wherein, for example, a resistance ratio of the resistors 24 and 29 of one to ten, that is to say a tenfold gain, results in a peak-white value w=35V in the signal SC. A voltage U of, for example, 20V, which is also the maximum voltage which can be present across the series arrangement of the diode 31 and the zener diode 32, which, together, form an amplitude limiter (31,32), is indicated at the signal SC. This implies that the very high signal peaks in the signals S1, S2 or S3, which can, for example, be as high as fifteen times and more the peak-white value, are limited in the example given to twice the peak-white value w of the signal SC, with which the limiting value h=25V is associated.

In practice it furthermore appears advantageous to utilize the picture signal S1, S2 or S3 not with the full bandwidth, in the order of magnitude of 5 MHz, for deriving the control signal SC, but to perform a bandwidth limitation to, in the order of magnitude of, 1.5 MHz. The amplifier (24–34) is provided for this purpose with a bandwidth limiter (29–30).

For the control purposes, control output 35 of control stage (18–35) is connected via coupling capacitors 36, 37 and 38, respectively, to the control electrodes 5 of the pick-up tubes 1, 2 or 3. The control electrode 5 of the pick-up tube 1 is connected, for setting purposes, to a setting output 39 of an adjusting stage (39–42), constituted by a potentiometer 40 disposed between the anode connecting point of the zener diode 28 and a thermal having a voltage of −150V, a diode 41, connected to the potentiometer tap and, at the diode 41 cathode, to the setting output 39 and via a resistor 42 to the terminal having the voltage −150V. Likewise the control electrodes 5 of the pick-up tubes 2 and 3, respectively, are connected to setting ouputs 43 and 47, respectively, of setting stages (43–46) and (47–50), respectively, formed by potentiometers 44 and 48, respectively; a diodes 45 and 49, respectively, and a resistors 46 and 50, respectively.

The cathodes 4 of the pick-up tubes 1, 2 and 3 are interconnected and, via a change-over stage 51, are connectable to the anode connecting point of the zener diode 28, having the voltage −45V, or to ground. The change-over stage 51 is operative for the line and field blanking, for which purpose it is supplied with a blanking signal which is shown in the drawing as line blanking signal SB. In the blanking periods the cathode 4, which then carries the ground potential, supplies no electron beam.

The setting outputs 39, 43 and 47 carry the respective setting voltages V1, V2 and V3.

The setting voltages V1, V2 and V3 are adjusted by means of the potentiometers 40, 44 and 48 in dependency on the parameters and the use of the pick-up tubes 1, 2 or 3. What is required is that, during the recording of a scene in which the picture signal contains the nominal values only, the pick-up tubes operate satisfactorily. It holds, for example, that in a color television camera a ⅔" pick-up tube used for generating the green, red and blue color signals, respectively, carries beam currents of 300 nA, 150 nA and 100 nA, respectively. The control signal SC is superimposed on the setting voltages V1, V2 and V3 via the coupling capacitors 36, 37 and 38. The varying video information in the signal SC results in a variation of the voltage on the control electrodes 4, for which it applies that small voltage variations of a few volts hardly affect the beam current, as is apparent from the current-voltage characteristics for the beam current and the control electrode voltage, specified in data handbooks. Larger voltage transients, for example above 10V, influence the beam current to a more than proportional extent. In practice a stable beam current control appears to occur without unwanted oscillations at a limitation of the voltage transient to U=20V from black level b=45V.

The connecting point of the control electrode 5 of the pick-up tube 1 to the coupling capacitor 36 and the setting output 39 of the setting stage (39–42) is connected, via the anode-cathode path of a diode 52, to the connecting point carrying the voltage of −45V and being connected to the cathode 4. This was done to obviate the possibility that the control electrode voltage becomes less negative than the cathode voltage, which may, for example, happen if the setting voltage V1 is adjusted less negative than −65V and the voltage transient in the control signal amounts to U=20V. For the same purpose, that is to say to prevent damage to the electron guns (4,5,6) of the pick-up tubes 2 and 3, diodes 53 and 54 are disposed at the setting outputs 43 and 47.

It should be noted that the control circuit (18–54) thus formed for the beam current control, in essence the entire video information being utilized (control signal SC) by means of the amplifier (24–34), operates satisfactorily in practice without disturbing oscillations, while, by way of illustration, some values of the components used in the control circuit (81–54) are given:

Resistor 24:1kΩ
Resistor 29:10kΩ
Capacitor 30:10pF
Resistor 34:10KΩ
Coupling capacitors 36, 37 and 38:100nF
Potentiometers 40, 44 and 48:100kΩ
Resistors 42, 46 and 50:1MΩ

What is claimed is:

1. A television camera comprising at least one pick-up tube and a control circuit for the intensity control of an electron beam present in the pick-up tube, the electron beam being generated by an electron gun comprising at least a cathode and a control electrode, an output, carrying a picture signal, of the pick-up tube being connected for beam current intensity control to a control input of the control circuit, an output of which, carrying a control signal, being connected to the control electrode in the pick-up tube, the control circuit comprising a setting stage, for an adjustment of the beam current intensity, and a control stage for an automatic control thereof, wherein the control stage comprises, provided between the control input of the control circuit and the output of the control stage, a video frequency picture signal amplifier suitable for processing the picture signal generated by the pick-up tube, said amplifier having an amplitude limiter therein, the output of the control stage being connected through a coupling capacitor to the output of the setting stage and at the same time to the control electrode of the pick-up tube.

2. A television camera as claimed in claim 1, suitable for color television and comprising to that end at least two pick-up tubes, wherein a single control stage and at least two setting stages are provided, each of these setting stages being connected by means of a setting stage output to the control electrode of the electron gun of one of the pick-up tubes, these control electrodes of the pick-up tubes each being connected via a coupling capacitor to the output of the control stage, the control circuit comprising at least two control inputs connected to the picture signal outputs of the pick-up tubes, which control inputs are connected to said video frequency picture signal amplifier via a circuit for passing the picture signal having the instantaneous highest value.

3. A television camera as claimed in claim 1 or 2 wherein, characterized in that the video frequency picture signal amplifier further comprises a bandwidth limiter resulting in a bandwidth limitation to, in the order of, magnitude of 1.5 mHz.

4. A television camera as claimed in claim 2 wherein the connection of said coupling capacitor to the control electrode of the electron gun of one of the pick-up tubes is connected via the anode-cathode path of a diode to a voltage supply terminal for the cathode of the electron gun of the pick-up tube.

* * * * *